INVENTOR
GEORGE B. PARRENT JR.
BY
ATTORNEY

GEORGE B. PARRENT JR.
INVENTOR

BY
ATTORNEY

INVENTOR
GEORGE B. PARRENT JR.

ATTORNEY

United States Patent Office 3,388,652
Patented June 18, 1968

3,388,652
PHOTOGRAPHIC PROCESSING CONTROL
George B. Parrent, Jr., Carlisle, Mass., assignor to Technical Operations, Incorporated, Burlington, Mass., a corporation of Delaware
Filed May 27, 1965, Ser. No. 459,162
15 Claims. (Cl. 95—89)

This invention relates to control of photographic processing and in particular to the determination of development and printing parameters to enhance contrast of predetermined detail in photographic frames.

Considerable effort has been directed in the past to the general problem of providing an automatic method of monitoring in real time the buildup of a photographic image as a film is being developed. A second problem is that of establishing an automatic exposure control in the printing process. Although these two problems may at first appear quite unrelated, they are actually almost identical from a conceptual viewpoint. Thus, in the processing problem one would like to monitor the development in such a way as to center the H and D curve of the process around that exposure level corresponding to the exposure of the objects of interest as opposed to undesired detail such as clouds. In the printing problem we are faced with the same question: What exposure will center the H and D curve around the density of the desired detail as opposed to the unwanted detail? Automatic exposure control is, of course, not necessary if there is time to visually inspect the process in each case, but such manual development is impossible when processing large volumes of material.

The usefulness of an automatic method of control, of course, is that films which might otherwise be lost through underdevelopment or overdevelopment can be saved by terminating development at the optimum time. Customarily such decisions are made by manually developing each frame and observing the image buildup, or by carefully controlling the condition of exposure so that the need for such control in development is obviated. The first of these methods is of little use in handling large volumes of film from an aerial cartographic survey for example, nor is it of use when a given scene contains a brightness range that exceeds the dynamic range of the photographic film. Thus, in modern photo-reconnaissance systems the ability to monitor the buildup of the silver image during the processing of the film is a real need.

A first approximation would be to monitor the average transmission as a light meter does. One would have to carefully select a nonactinic light source to monitor the image buildup, but this point is unimportant in a conceptual discussion. Such a light meter approach to automation is unsatisfactory, however, since it can easily be misleading. For example, a large bright cloud would affect the reading much more than a small city or clump of buildings sitting more or less in the shade of the cloud.

Another solution might be to scan the film with an infrared microdensitometer and attempt to correlate the output of the densitometer with the state of development of the image. This solution must also be disregarded, because of the high rate of traverse of the film through the developing system and because of the high resolution obtainable by modern reconnaissance systems compared to that obtainable with infrared systems.

Now in accordance with the present invention it has been found possible to control processing by viewing an entire frame simultaneously with particular sensitivity to high resolution and built-in protection against large area background deceptions. This is accomplished by first uniformly illuminating the frame with coherent collimated quasi-monochromatic light and, in the case of a transparency, measuring the total transmission with an integrating detector. This transmitted light is also sent through a transforming lens to one or more point detectors in the transform plane. With the frame in the front focal plane of the lens and the transform plane being the back focal plane of the lens, all low frequency background components of the transmitted light will occupy the zero and a few adjacent diffraction orders in the center of the transform plane. By comparing the low frequency components as measured by the point detectors with the overall transmissivity as measured by the integrating detector, the average light level of the high frequency (relatively high resolution) detail can be determined. This can then be used to provide optimum processing for the high frequency detail. Since the higher the resolution, the farther spread will be the diffraction orders in the transform plane, it is also possible to measure directly the transmissivity of resolution having a given range of frequencies. This is accomplished by placing point detectors spaced out from the center of the transform plane by a distance related to the given frequencies. It is thus possible to process the frame for maximum contrast in any specific frequency range bringing out small close detail or large widely spaced detail as desired. Thus it is an object of the invention to define a method of contrast control in photographic processing.

It is a further object of the invention to define a method of exposure control in photographic printing.

It is a further object of the invention to define a method of determining development time in photographic processing.

It is still a further object of the invention to define means for determining processing control parameters for photography.

Further objects and features of the invention will be understood upon reading the following description together with drawings in which.

The concept of the present invention is based on the fact that an image can be considered as a plurality of diffracting disturbances of differing frequency characteristics. Thus the smaller and/or more closely spaced the disturbances are the higher is their frequency characteristics. When the image is placed in the front focal plane of a converging lens, and illuminated with collimated coherent quasi-monochromatic light, a diffraction pattern will be located in the back focal plane of the lens which is mathematically expressible as a Fourier transform of the image. Light transmitted by portions of the image that have no diffracting effect will be focused to a spot in the back focal plane and light transmitted by portions having successively higher frequency characteristics will appear at successively greater radii from said spot. Thus the spot is representative of mean transmission or background while light appearing at successively greater radii from the spot represents successively finer detail in the image.

Figure 1:
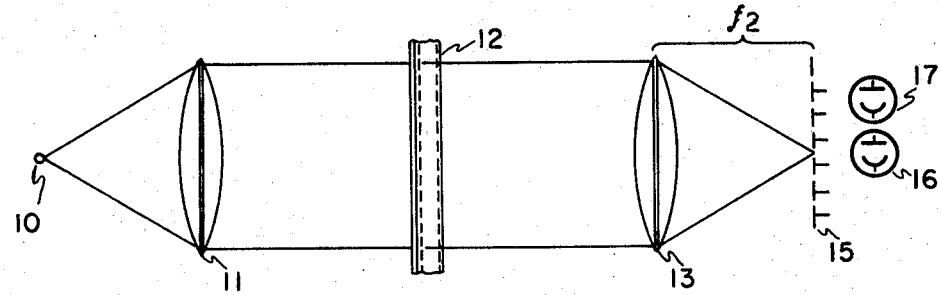
FIG. 1 is a diagrammatic illustration of an optical system according to the invention.

FIG. 1 shows the basic optical system for obtaining contrast parameters in accordance with the invention. A point light source 10 of narrow spectral width is suitably obtained by focusing a filtered extended light source on to a pinhole. The light passed through the pinhole is then collimated by a lens 11. The collimator is designed to provide a collimated beam of sufficient diameter to illuminate the area of film frame 12.

Optimally the illuminating components can be described as any light source with or without auxiliary optics that will produce over the image frame a coherent collimated beam of quasi-monochromatic light. Empirically it has been found that both coherency and the width of the chromatic spectrum can be varied to a considerable degree particularly if the frequency characteristics of the image detail to receive optimum exposure cover a wide range.

Transform lens 13 placed on the opposite side of the film must be of sufficient size to collect the light transmitted through the area of the film frame. Transform lens 13 brings light undisturbed by film frame 12 to a point focus in transform plane 15 one focal length in back of lens 13. Lens 13 produces a Fourier transform of the light disturbed by frame 12 in the nature of a diffraction pattern at transform plane 15.

Photodetectors 16 and 17 placed in transform plane 15 detect the amplitude of light related to different image frequency components.

Figure 2:
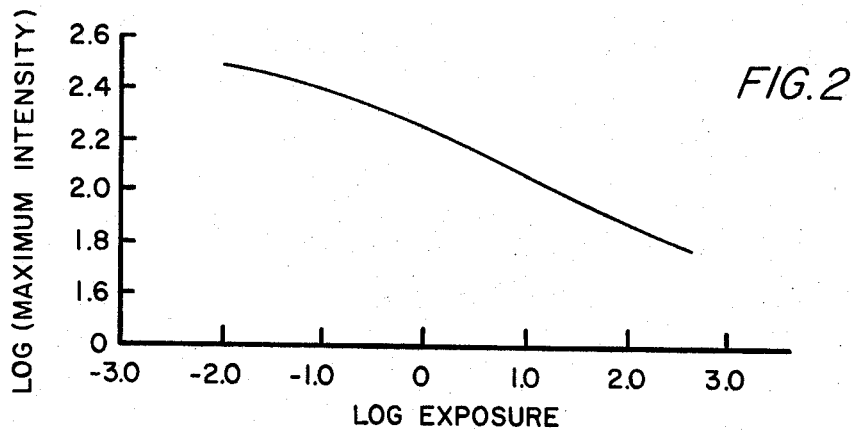
FIG. 2 is a graphical representation of intensity at the central maximum in plane 15 of FIG. 1 for a series of identical scene photographs of different exposure.

The character of information received by photodetectors in the transform plane is best explained by experimental example. Five exposures, a, b, c, d and e were taken of the same scene, with the same camera film and exposure time. However they were taken successively larger F openings. All five exposures were processed identically, i.e. to the same gamma. The negative transparencies were placed in an optical system such as illustrated in FIG. 1. Instead of placing photodetectors in the transform plane, photographs of the Fourier transform were taken and densitometer traces were made of the Fourier transforms. FIG. 2 is a plot of the central maxima (called the D.C. spot by analogy to electrical direct current) of the transforms made from the densitometer traces. As should be expected, since this parameter is simply a measure of the mean transmission, this curve is the H and D curve of the process.

Figure 3:
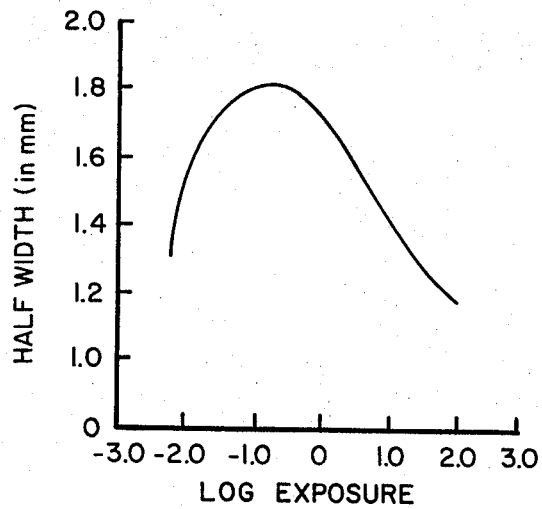
FIG. 3 is a graphical representation of the half width of the central maximum in plane 15 of FIG. 1 for a series of identical scene photographs of different exposure.

The next two curves illustrate the manner in which the image builds up as seen in the Fourier transform plane. First, as the image builds, the low frequencies appear and result in a spreading of the D.C. spot. To provide an illustration of this phenomenon, a plot of the half width of the central diffraction order is shown in FIG. 3. This parameter peaks at the same frame that would be selected by the casual observer as optimum. In the present instance this happens to be exposure c.

Figure 4:
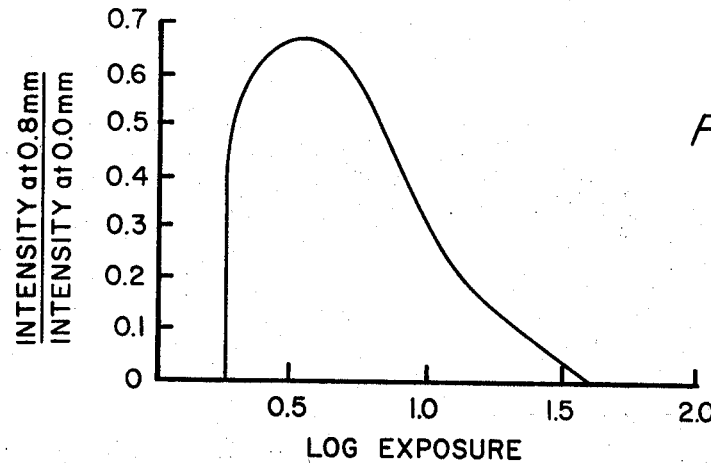
FIG. 4 is a graphical representation of the ratio of intensity at a radial distance from the center of the intensity at the center of plane 15 of FIG. 1 for a series of identical scene photographs of different exposure.

FIG. 4 is a graphical representation of a contrast parameter obtainable in accordance with the invention. A spatial frequency was chosen arbitrarily at .8 millimeters from the center of the diffraction pattern. Plotted in FIG. 4 is the ratio of the intensity at the arbitrarily selected spatial frequency (i.e. intensity of the diffraction pattern a selected distance from the central maxima) to the intensity of the central maxima versus exposure. The greater this ratio is the more contrast will be found in the selected frequency. Note that the curve of FIG. 4 peaks at about LOG EXPOSURE 0.6 while the curve of FIG. 3 peaks at about LOG EXPOSURE −1.0. Thus the best exposure for one spectral band is not necessarily the best exposure for other spectral bands.

Using the optical system of FIG. 1, consider the Fourier transform of infrared (or other nonactinic light) transmission through an exposed frame of film 12 while it is being developed. Initially, there is no silver image and the transmission is a constant; hence the spatial spectrum consists of a delta function. As the processing proceeds, a silver image builds up and the transmission decreases. If the film were uniformly exposed, this would result simply in a decrease in the energy associated with the D.C. spot in transform space, and this decrease would provide in some sense a measure of the density of the film. If there is a latent image on the film, however, the developing image will possess structure, and the energy in the D.C. spot will decrease not only because the average silver density is increasing but also because some of the light is being diffracted into higher frequency regions of the Fourier transform plane. This is the phenomena we wish to take advantage of for contrast parameter control in developing or processing.

A first approximation would be simply to observe the decrease of the central order (D.C. spot) and stop processing when this has diminished to a preselected value. This processing to an average density is equivalent to the light meter approach mentioned earlier. Such a system would easily be fooled, for example, by a film that contained a large amount of cloud cover, resulting in a high average density, while the desired detail contained in the relatively poorly lighted areas did not get processed at all. In other words, the film has a limited dynamic range, and the problem is to center that dynamic range around the part of the exposure (scene) that contains the most "information."

Figure 5:
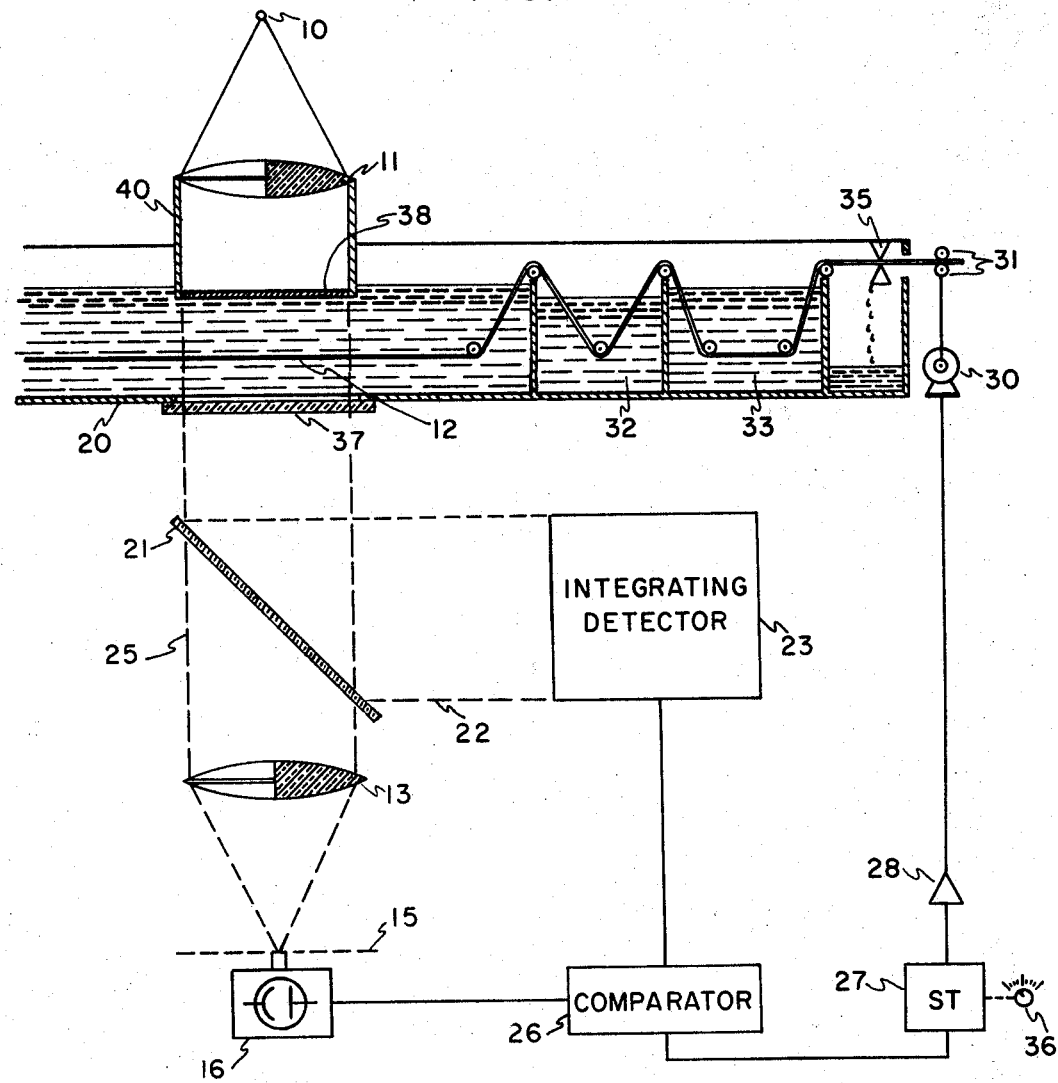
FIG. 5 is a diagrammatic illustration of automatic development apparatus with a first embodiment of means to obtain contrast parameters for controlling development in accordance with the invention.

A second approximation can be obtained as illustrated by FIG. 5. In FIG. 5 a frame 12 of exposed film is shown in a developing tank. Nonactinic light from point source 10 is collimated by lens 11 and illuminates frame 12. Light passing through frame 12 is split into two beams by partially silvered mirror 21. First beams 22 is receiver by integrating detector 23 which measures the total transmission. Second beam 25 passes through transforming lens 13 and is detected by a point detector 16 in the center of the transform plane. Detector 16 thus measures the amplitude of the D.C. spot. The output of detector 16 is compared with the output of detector 23 by comparator 26 to give a measure of what part of the silver image is related to uniform background and what part is related to image components. As the difference in these outputs increases the contrast in the image components will increase. The output from the comparator can be used directly to control the speed of the film through the processing system. For example, a threshold sensing device such as Schmitt trigger 27 can operate motor control amplifier 28 controlling motor 30. Motor 30 operating through drive rollers 31 pulls the film through developing tank 20, wash tank 32, fixing tank 33 and doctor blades 35. The threshold sensing device desirably has a threshold adjusting control 36 for setting the threshold at a point below the maximum predicted output of the comparator to allow for delays inherent in photographic processing. This system can be set up for frame-by-frame operation with stop and start control in which case the frames must be widely spaced on the film or transparent conveyor means. Or the system can operate with continuous motion in which case some of the frame by frame accuracy will be lost.

It is desirable to minimize disturbance of the diffraction pattern obtained in FIG. 5 due to the processing solution and tank. In FIG. 5 a window 37 of optical glass is mounted in the bottom of developing tank 20 and a second window of optical glass mounted in a watertight frame 40 penetrates the surface of the developing solution to prevent surface conditions of the solution from interfering with the optical path.

The system illustrated FIG. 5 is more difficult to confuse since it provides a measure of the amount of diffracted light rather than of the average density. Furthermore this arrangement gives us the option of allowing an arbitrarily selected amount of low frequency detail to be counted as D.C. Thus by increasing the pick up area for detector 16 clouds or other low frequency undesired detail can be included as part of the background.

Going from the arrangement of FIG. 5, more and more sophisticated systems can be designed by placing detectors at those points in the transform plane that correspond to preselected spatial frequencies. For example, if it is known that most of the desired information is contained in a given band, say 50 to 150 line pairs per millimeter, a detector can be placed in this region of the transform plane. By comparing the output of this detector with the other two, we can determine the contrast of this portioin of the image. If most of the man-made or other higher frequency details lie in the shadow of a cloud, this third system would center the straight line portion of the H and D curve around the exposure level of these details. This would of course probably result in burning out the cloud cover.

Figure 6:
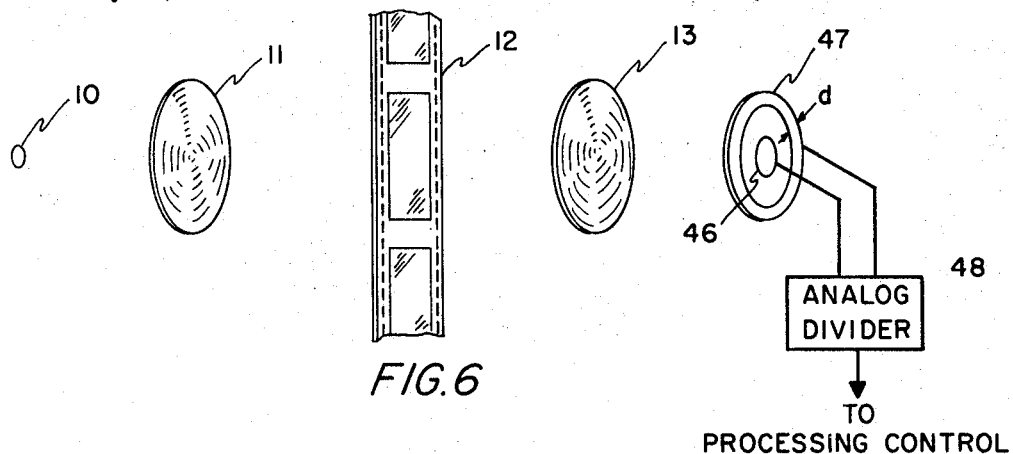
FIG. 6 is a diagrammatic illustration of a second embodiment of means for obtaining contrast parameters to control the apparatus of FIG. 5.

FIG. 6 illustrates an embodiment of the invention that can be used in the system of FIG. 5 as an alternative. The optical system will be seen as the same as in FIG. 1 and little different from that of FIG. 5 except that no beam splitter is required and two photodetectors are placed in the transform plane. Photodetector 46 has a circular sensing area and photodetector 47 has an annular sensing area.

Of particular interest in the contrast parameter with which optimum development of a high frequency band of information can be determined. An example of this parameter has been illustrated by the curve reproduced in FIG. 4. The data for this contrast parameter can be obtained automatically with circuitry such as analog divider 48 which provides the ratio of the output from detector 47 to that from detector 46. Various means of performing electrical division are described in the analog computer art. When the ratio of these outputs is a maximum, development for the higher frequency band of information is optimum.

The position of detector 47 which measures the energy associated with the frequency band for which controlled development is desired is dependent on the focal length of transform lens 13. Given the mean frequency $\bar{\nu}$ which must be predetermined and the focal length $f_2$ (see FIG. 1) the energy associated with $\bar{\nu}$ will be diffracted to a position in the transform plane of lens 13 given by the equation $$\bar{r} = \lambda f_2 \bar{\nu}$$

where $\bar{r}$ is the distance from the optical axis of the system and the $\lambda$ is the wavelength of the light source used.

It is known that the energy in the transform plane is a frequency spectrum of the negative being studied and this energy will be continuous providing that the frequency spectrum of the negative is continuous. Thus a detector of finite physical dimensions will respond to a finite frequency distribution dependent on the aperture size of the detector. If the frequency band, which is to be preferentially developed, includes frequencies from $\nu_1$ to $\nu_2$ where $\bar{\nu}$ is the average frequency of this band i.e.

$$\bar{\nu} = \frac{\nu_1 + \nu_2}{2}$$

then the aperture size of the detector must be sufficiently large to include the spectrum of $\nu_1$ to $\nu_2$ displayed in the transform plane. If $r_2$ is the radial position of frequency $\nu_2$ on the transform plane and $r_1$ is the position of $\nu_1$ then the width, $d_1$ of the aperture of detector 47 must be $$d = r_2 - r_1 = \lambda f_2 (\nu_2 - \nu_1)$$

Thus the center of the detector aperture must be placed at $\bar{\nu}$ and the width must be $d$ in order that the energy of the high frequency spectrum be measuerd. As the frequency distribution in normal scenes is not always unidirectional and most generally is random in direction, the position of a particular frequency band is circularly symmetric about the optical axis of the transform lens. But intensity distribution in the band depends on directionality in the image and generally will not be circularly symmetric. Thus a further requirement of photodetector 47 placed in the transform plane is that it be annular so that it will respond to a given frequency band independent of its directionality in the negative. Thus the detector, for the higher frequency bands, can consists of an annular ring shaped photosensitive element which has a width of $d$ and a radius of $\bar{r}$. An alternative detector has a sensing aperture with opaque stops which only allow the passage of energy within the radial frequency band of interest. A circular photosensitive element such as photomultiplier would measure the average energy transmitted through the aperture giving a result similar to the annular ring shaped detector.

Similarly detector 46 has a finite aperture and thus measures the energy associated with a finite spectral width. As mentioned above, detector 46 is placed on the optical axis in the transform plane of lens 13 and measures the energy associated with background transmission and very low frequency information. The diameter of the aperture can be controlled so that a limited frequency band can be measured. The sensing aperture of this detector should cover a circular area to include D.C. energy.

The above paragraphs specify the position of the detectors and the size of the detector apertures. The elements of the optical system can be chosen to fit the physical dimensions of available processing and/or printing systems and the frequency spectrum of interest can be predetermined from analysis of the type of negatives to be studied and the information desired. Thus all factors of the above equations are specific.

In using contrast parameters in accordance with the present invention for development processing, inherent delays (cannot stop action of developing solution instantaneously) and other factors, outside the domain of the contrast parameters utilized, make it desirable to exercise some visual monitoring. In the system of FIG. 5 and variations thereof, this visual monitoring enables adjustment of the threshold sensing device. Such adjustment has usually been found necessary when the developer solution is changed for a solution with different speed or when film of markedly different characteristics is developed. Calibration charts can be made to cover cost conditions when visual monitoring must be avoided.

No such problem as inherent delay arises in the application of the present technique to printing. The film has already been processed, the photographic paper speed is known and the detectors respond to the logarithm of transmission from the negative.

Figure 7:
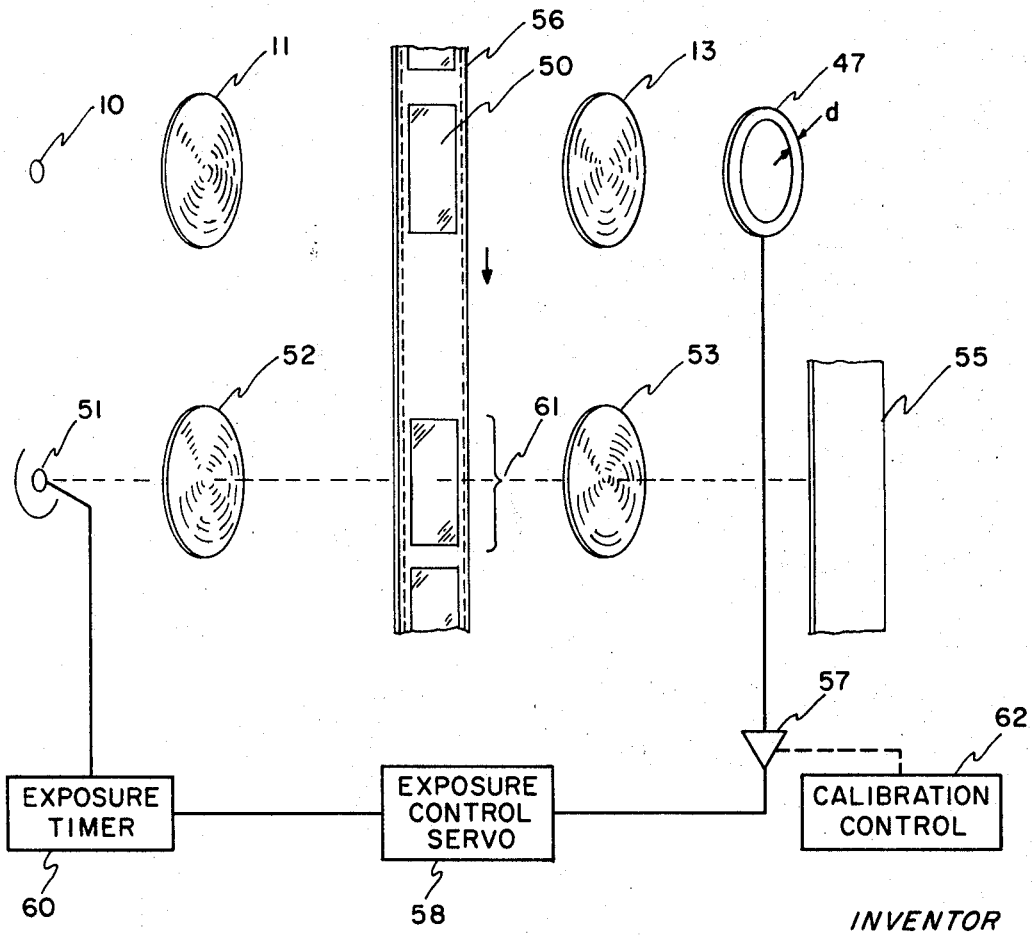
FIG. 7 is a diagrammatic illustration of an automatic photographic printing system in accordance with the invention.

FIG. 7 shows a simplified diagram of a photographic printing system in accordance with the present invention. The basic system for automatic printing was first devised by C. Tuttle about 1937. Many improvements and variations have been made since then. For example see "Printing Exposure Determination by Photoelectric Methods" by Lloyd E. Varden and P. Krause Amer. Ann. Phot. 1950, 64:30. These systems all examine one or more transmission characteristics of the negative to determine the amplitude of exposure. Tuttle determined that either the total density or the minimum density could be used to give good results. The system of FIG. 7 uses density in image detail having predetermined frequency characteristics to determine optimum exposure for that particular image detail.

The prior art systems are generally quite similar to the system illustrated in FIG. 7 with the exception of particular characteristics of the photoelectric system. Light source 51 and lenses 52 and 53 represent the exposure source and optical system for exposing the print paper 55 to an image from film 56. An optical system similar to that of FIG. 1 provides a Fourier transform of a frame to be printed and the transmission characteristics for a selected frequency range are detected by annular apertured photoelectric detector 47. The output of this detector is used to set the exposure amplitude. While several alternatives are readily apparent for setting the exposure amplitude, a specific arrangement is illustrated by way of example in FIG. 7. The detector output is amplified by amplifier 57 and a servo system 58 is used to preset the exposure timer 60. When frame 50 of film 56 is moved into exposure position 61, the timer is tripped and the print is exposed. Calibration of the system can be obtained by controlling amplification in amplifier 57 by control 62.

As in FIG. 6, detector 47 has an annular aperture that is adjustable in radius ($r$) and width ($d$) so as to detect the predetermined frequency spectrum. A detector operating in this fashion is obtained, for example, by using a detector with a large circular sensing area and utilizing adjustable stops such as are common in optical systems for aperture control. The output of a single photodetector indicating transmission at the desired frequency spectrum has been found adequate for printing purposes. The required exposure to give optimum exposure of the selected frequency band is a direct function of the detector output.

As is readily apparent, the present invention is also useful in reproduction processes other than silver halide photography. The build up of any type of image that becomes visible in a nonactinic light while developing in a developer that does not seriously interfere with the optical path can be monitored by the inventive techniques. Exposure time for making prints by electro-photographic methods, thermographic methods and most other reproductive methods using radiation sensitive materials can also be determined in accordance with the inventive concept. Thus it is intended to cover the invention broadly within the spirit and scope of the appended claims.

What is claimed is:

1. A method of determining image density in photographic material as related to image detail having predetermined frequency characteristics comprising:
   (a) coherently illuminating said image with collimated light;
   (b) collecting light from said image with a transforming lens so as to produce a Fourier transform of the light from said image;
   (c) photoelectrically measuring the light intensity in a circular zone of said transform containing light related to predetermined image frequency components to obtain a voltage with an amplitude proportional to the intensity of said frequency components; and,
   (d) using said voltage to compute image density related to said predetermined frequency characteristic.

2. A method of determining image density in accordance with claim 1 wherein said predetermined frequency characteristics and said image frequency components are characterized by the same frequencies.

3. A contrast parameter technique for optimizing photographic processing in accordance with the frequency characteristics of desired image detail comprising:
   (a) coherently illuminating a frame being processed by collimated light;
   (b) collecting light passing from said frame with a transforming lens to define a Fourier transform of image detail in said frame at a transform plane;
   (c) reading the intensity of the D.C. spot in said transform plane with a photodetector;
   (d) reading the light intensity in an annular ring centered around said D.C. spot at a radial distance to which a predetermined frequency of image detail with diffract light in said transform plane; and,
   (e) controlling the processing so that the ratio of the intensity in said annular ring to the intensity of said D.C. spot reaches a predetermined level.

4. A contrast parameter technique according to claim 3 in which said predetermined level is substantially the maximum value that said ratio can reach.

5. A method of controlling photographic development by examining the buildup of the silver image comprising:
   (a) immersing a frame of photographic material bearing a latent image in a developer;
   (b) coherently illuminating said frame with a beam of collimated nonactinic light;
   (c) intercepting light passing from said frame and dividing it into a first beam and a second beam;
   (d) detecting the integrated intensity of the light in said first beam;
   (e) passing the light in said second beam through a transforming lens to produce a Fourier transform of the light from said frame in a transform plane;
   (f) detecting the light intensity in a circular area centered at and including the central maxima of the Fourier transform;
   (g) comparing the detected light intensities from said two beams to find their difference; and,
   (h) removing said frame from said developer to a fixer when said difference reaches a predetermined level.

6. A method of controlling photographic development in accordance with claim 5 in which said circular area encompasses light diffracted by low frequency image detail of background significance only.

7. A method of controlling photographic development in accordance with claim 5 wherein said light intensities are detected as electrical signals and said removing said frame from the developer is controlled by a threshold sensitive device, a motor control amplifier responsive to said device and a motor responsive to said amplifier operable to move said frame through a sequence of processing positions, said threshold sensitive device activated by said difference reaching said predetermined level.

8. A method for control of photographic development by analyzing the Fourier transform of the silver image as it builds up comprising:
   (a) commencing development of a latent image bearing frame of photographic material by immersion in a developer;
   (b) coherently illuminating said frame through said developer with collimated nonactinic light;
   (c) transforming said light as modified by said frame into a diffraction pattern in a Fourier transform plane;
   (d) photoelectrically detecting the mean intensity of said light as represented by the central maxima in said transform plane to obtain a first electrical voltage;
   (e) photoelectrically detecting the intensity of said diffracted by a predetermined range of image detail frequencies at an annular area around said central maxima to obtain a second electrical voltage; and,
   (f) terminating said development when the ratio of said second electrical signal to said first electrical signal reaches a predetermined level.

9. A method for control of photographic development according to claim 8 in which said predetermined level is the maximum value that said ratio can reach during development.

10. A method for control of photographic development according to claim 8 in which said range of image detail frequencies covers the image detail for which optimum contrast is desired.

11. A method of optimizing development contrast for detail of selected frequency characteristics in photographic images comprising:

(a) forming a Fourier transformer of a photographic frame during development;
(b) measuring intensity in an area of said transform representative of a predetermined range of image detail frequency; and,
(c) terminating development at a time governed by a function in which said intensity is a controlling variable.

12. A method of determining image contrast parameters comprising:
(a) coherently illuminating an image with collimated light;
(b) collecting light passing from said image with a transforming lens so as to form a Fourier transform of the light passing from said image at a transform plane; and,
(c) measuring the light intensity at a plurality of zones in said transform plane each related to a range of frequency characteristics in the image detail.

13. A method of determining image contrast parameters according to claim 12 in which said light passing from said image is light transmitted by said image.

14. A method of exposure control in automatic photographic printing apparatus comprising:

(a) coherently illuminating a photographic frame from which a print is to be made with collimated light;
(b) transforming the light passing from said image so as to obtain a Fourier transform diffraction pattern in a transform plane;
(c) detecting the light intensity at said transform plane in an annular ring symmetrically positioned about the center of said transformer plane at a radial distance from said center that is determined by the frequency chaarcteristics of the image detail for which optimum contrast is desired; and,
(d) setting the exposure time for printing as a function of said intensity.

15. A method of exposure control according to claim 14 in which said light passing from said image is light transmitted by said image and said light intensity is a measure of the transmission of said frame by image detail having said frequency characteristics.

No references cited.

NORMAN G. TORCHIN, *Primary Examiner.*

J. R. EVERETT, *Assistant Examiner.*